United States Patent
Henriksen

(10) Patent No.: US 8,446,026 B2
(45) Date of Patent: May 21, 2013

(54) SYSTEM FOR MOORING A FLOATING PLANT FOR THE PRODUCTION OF ENERGY FROM CURRENTS IN WATER

(75) Inventor: Svein Dag Henriksen, Harstad (NO)

(73) Assignee: Hydra Tidal Energy Technology AS, Harstad (NO)

( * ) Notice: Subject to any disclaimer, the term of this patent is extended or adjusted under 35 U.S.C. 154(b) by 139 days.

(21) Appl. No.: 13/001,175

(22) PCT Filed: Jun. 24, 2009

(86) PCT No.: PCT/NO2009/000235
§ 371 (c)(1),
(2), (4) Date: Jul. 8, 2011

(87) PCT Pub. No.: WO2009/157778
PCT Pub. Date: Dec. 30, 2009

(65) Prior Publication Data
US 2011/0256784 A1 Oct. 20, 2011

(30) Foreign Application Priority Data
Jun. 27, 2008 (NO) .................................. 20082921

(51) Int. Cl.
*B63B 21/00* (2006.01)
*F03B 13/10* (2006.01)
(52) U.S. Cl.
USPC ......................... 290/42; 114/230.23; 114/293
(58) Field of Classification Search .. 290/42; 114/230.2, 114/293, 230.23; 441/3
See application file for complete search history.

(56) References Cited

U.S. PATENT DOCUMENTS

| 3,726,247 | A | 4/1973 | Dalzell |
| 4,509,448 | A | 4/1985 | Pease et al. |
| 5,044,297 | A * | 9/1991 | de Baan et al. ............... 114/293 |
| 6,811,355 | B2 * | 11/2004 | Poldervaart ................... 405/169 |
| 6,915,754 | B2 * | 7/2005 | Tsuyoshi et al. .............. 114/293 |
| 7,307,356 | B2 | 12/2007 | Fraenkel |
| 7,793,723 | B2 * | 9/2010 | Vedeld et al. ................. 166/355 |
| 2007/0284882 | A1 | 12/2007 | Costin |

FOREIGN PATENT DOCUMENTS

| GB | 2325708 A | 12/1998 |
| WO | 8100595 A1 | 3/1981 |
| WO | 2005061885 A1 | 7/2005 |
| WO | 2005061886 A1 | 7/2005 |
| WO | 2006061652 A1 | 6/2006 |
| WO | 2008100157 A1 | 8/2008 |
| WO | 2008149132 A1 | 12/2008 |

OTHER PUBLICATIONS

Norwegian Search Report dated Jan. 21, 2009.

* cited by examiner

*Primary Examiner* — Stephen Avila
(74) *Attorney, Agent, or Firm* — Harness, Dickey & Pierce, PLC

(57) ABSTRACT

A system for mooring a floating plant for the production of energy from currents in a body of water, comprising a plant (10) floating in the body of water and having at least one generator (7) for energy production, and at least one elongate first mooring element (24) which at a first end is connected to one end of the plant (10). The first mooring element (24) at its second end is attached to one buoyant element (50) floating in the body of water and anchored to a bottom (B) below the body of water, and the second end of the first mooring element (24) is connected to the buoyant element (50) at a level (d) in the body of water that corresponds to the level in the body of water at which the first end of the first mooring element (24) is connected to the floating plant (10), whereby the first mooring element (24) runs horizontally or almost horizontally in the body of water.

8 Claims, 4 Drawing Sheets

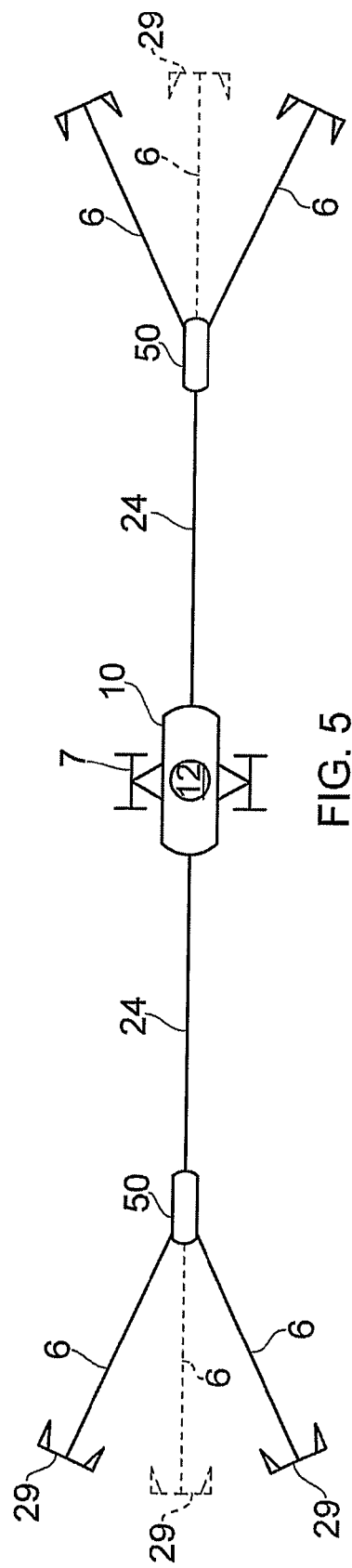

SYSTEM FOR MOORING A FLOATING PLANT FOR THE PRODUCTION OF ENERGY FROM CURRENTS IN WATER The invention relates to a system for mooring a floating plant for the production of energy from currents in a body of water, comprising a plant floating in a body of water and having at least one generator for energy production, and at least one elongate first mooring element which at a first end is connected to a first end of the plant. The invention is particularly useful in connection with the mooring of plants for the production of energy from currents in water, especially currents below the surface of oceans, lakes, rivers or other bodies of water. Such currents may, for example, be caused by ocean currents, tidal variations and/or subsea topography (e.g., channels, river beds or other narrow passages under water).

U.S. Pat. No. 3,726,247 teaches a mooring system for a floating vessel. U.S. Pat. No. 7,307,356 B2, WO 2006/061652A1 and WO 2005/061886A1 teach different plants for the production of energy from water currents.

WO 88/04362 describes a floating water current power station consisting of a ring pontoon 3 floating on the water surface and which via a mooring bitt 5 and lines 2 is moored to an anchor on the seabed. The turbines are arranged hanging below the ring pontoon on a common beam and can as a unit be swung up to the surface within the area defined by the ring pontoon. The power station is able to rotate about the mooring bitt, the upper end of which is connected to a front pontoon 9 and the lower of end of which is secured to the anchors.

GB 2 256 011 teaches a floating plant which floats below the water surface by its own buoyancy and is attached to a mooring cable 6 via a strut 5. The strut, which may either be fixedly or rotatably fastened to the generator housing, is at its other end fastened to the mooring cable 6 which is secured to an anchor 7 on the seabed. The other end of the cable 6 is, in one embodiment, fastened to a buoy 1 on the water surface.

The known plants are primarily designed with a view to being located in near-shore waters where wind and wave forces are weaker than they may be in open sea. However, there is a substantial energy recovery potential in placing energy plants offshore or in other demanding environments. There is therefore a need for a plant for the production of energy from currents in water which can withstand larger environmental forces than the hitherto known plants.

However, plants installed offshore are subjected to large dynamic loads exerted by waves and wind. In the aforementioned plant for installation offshore, the part of the buoyant element that is above the water surface may be subjected to wave and wind loads such that the whole plant may be set in relatively strong motion, especially about the transverse axis of the plant. This results in structural challenges and also has a detrimental effect on the efficiency of the turbines. There is therefore a need for a plant and a mooring arrangement which are less susceptible to substantial environmental forces.

According to the invention there is therefore provided a system for mooring a floating plant for the production of energy from currents in a body of water, comprising a plant floating in the body of water and having at least one generator for energy production, and at least one elongate first mooring element which at a first end is attached to one end of the plant, characterised in that the first mooring element at its second end is attached to one buoyant element floating in the body of water and anchored to a bottom below the body of water, and in that the second end of the first mooring element is attached to the buoyant element at a level in the body of water that corresponds to the level in the body of water at which the first end of the first mooring element is attached to the floating plant, whereby the first mooring element runs horizontally or almost horizontally in the body of water.

The buoyant element is anchored to the bottom via at least one second elongate mooring element. In one embodiment, the second end of the first mooring element is attached to the buoyant element via a first suspension means, and the second elongate mooring element is attached to the buoyant element via at least one second suspension means, whilst the second end of the first mooring element is connected to the second elongate mooring element via an elongate intermediate portion between the first suspension means and the second suspension means. The plant is preferably ballastable and the lengths of the first suspension means and the second suspension means are adjustable such that the first mooring element runs horizontally or almost horizontally in the body of water at a distance from the water surface.

In one embodiment, the buoyant element has an elongate form and comprises attachments for the first and second suspension means at each end portion of the buoyant element. The buoyancy of the buoyant element in the body of water takes up essentially all vertical load components that are transferred from the bottom via the second elongate mooring element at each end portion of the buoyant element, whereby the first mooring element exerts essentially only horizontal tension loads on the plant when the plant is installed in the body of water.

The plant is, in one embodiment, adapted for submersion in the body of water and comprises a projecting part which projects above the water surface when the plant is in production.

In one embodiment, one elongate first mooring element is attached to a first end of the plant and a further elongate first mooring element is attached to a second, preferably opposite end of the plant.

The first elongate mooring element and the second elongate mooring element comprise chain, line, wire, cable or rope, or combinations thereof. The first elongate mooring element preferably comprises synthetic fibre rope or line of other weight-neutral material.

Embodiments of the invention are set forth the attached patent claims, and in the following description with reference to the attached drawings. It will be understood that the drawings merely show basic illustrations of typical exemplary embodiments, and that they should not be understood as limiting the invention. In the drawings like parts are indicated by like reference numerals, which will also be used below.

FIG. 5 is a schematic view of a third embodiment of the system according to the invention, seen from above.

Figure 2:
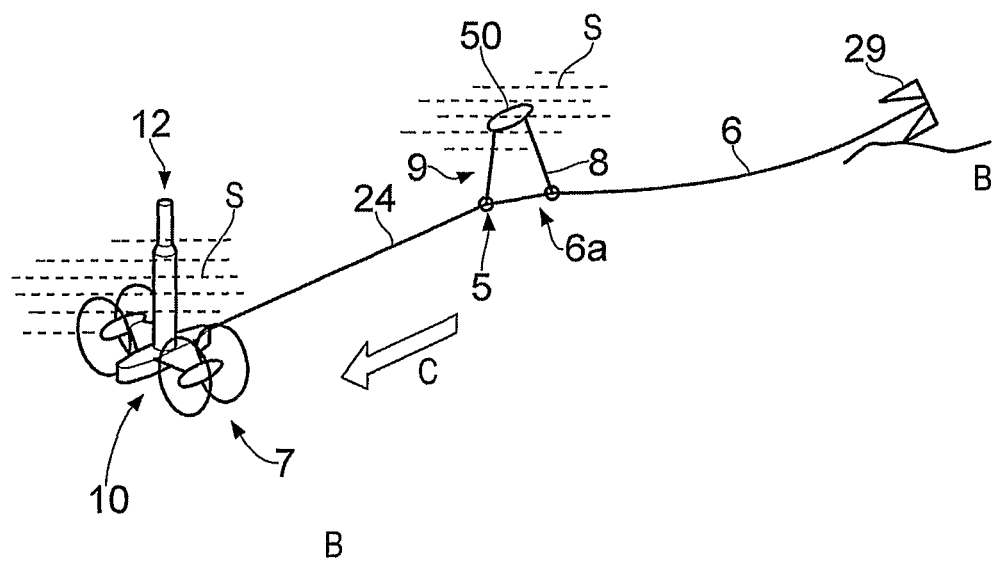
FIG. 2 is a schematic view of a second embodiment of the system according to the invention.
Figure 7:
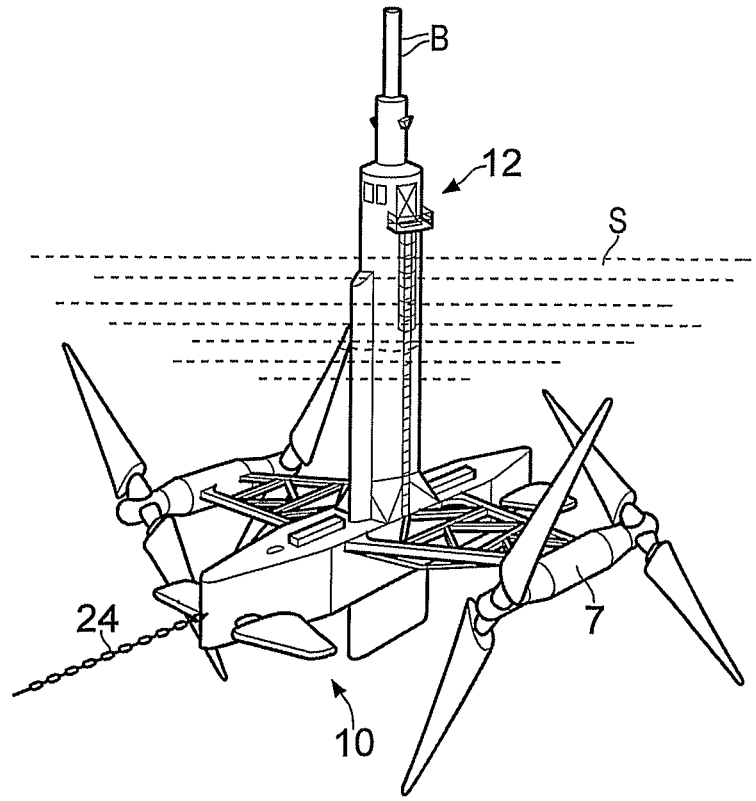
FIG. 7 is a perspective view of an embodiment of the floating plant.

FIG. 2 shows a system according to the invention in a basic form. A floating plant 10 is shown in a partially submerged position in a body of water, and comprising generator units 7 for the production of energy from water currents C. A tower structure 12 on the plant projects above the water surface S. When the plant is in the water, it is moored to the seabed B via anchor chains (and/or a combination of lines, wire, cables or ropes etc., referred to hereafter as mooring lines) that are fastened to the plant. Combinations of chain, steel wire and synthetic fibre rope may be used as mooring lines. A mooring line 24, preferably a synthetic fibre rope or line of other weight-neutral material, is fastened to one end of the plant 10, more precisely to the upstream side of the plant. FIG. 7 shows the first end of the mooring line 24 attached to the plant 10. Further details concerning the attachment, manoeuvring and locking of the mooring lines 24 to the plant 10 have been omitted as these details will be known to those of skill in the art. Similarly, the attachment of cables for the export of electric power and for controlling the plant has been omitted as the solutions used are known to those of skill in the art.

The plant 10 preferably houses ballast tanks (not shown) such that raising, lowering and positioning of the plant can be controlled by means of the ballasting and deballasting of these tanks.

The mooring line 24 is, at its first end, attached to one end of the floating plant 10. FIG. 2 shows how the second end of the mooring line 24 is attached to a buoyant element, such as a buoy, 50 which floats in the water surface S. The buoy is moored to the seabed B by means of a lower mooring line 6, preferably a chain connected to an anchor 29. The connection of the plant 10 to the buoy 50 is, in this embodiment, provided by the second end of the mooring line 24 being connected to a first suspension line 9 that is in turn connected to the buoy 50. The lower mooring line 6, which secures the buoy 50 to a mooring 29 on the seabed, is in this embodiment attached to the buoy 50 via a second suspension line 8. The suspension lines 8, 9, which preferably comprise steel wire, are preferably fastened to respective end portions of the buoy 50. An intermediate portion 6a joins the mooring line 24 to the lower mooring line 6.

Figure 1:
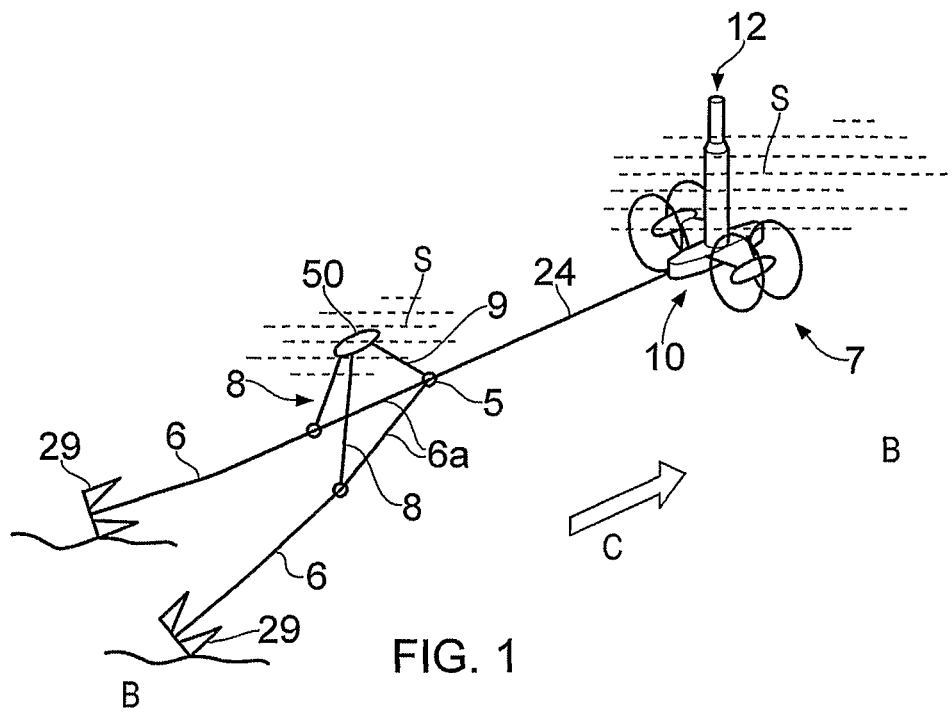
FIG. 1 is a schematic view of a first embodiment of the system according to the invention.

FIG. 1 shows a variant of the invention which comprises two lower mooring lines 6 connected to respective anchors 29 on the seabed. The lower mooring lines 6 are attached to the buoy 50 via respective suspension lines 8 and to the mooring line 24 via respective intermediate portions 6a. The connection to the mooring line 24 is, in the variant in FIG. 1, by means of respective intermediate portions 6a which are joined at a point of intersection 5.

Figure 3:
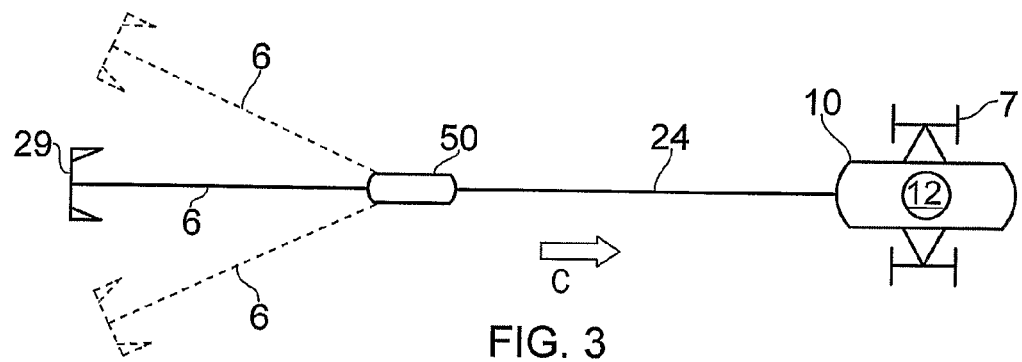
FIG. 3 is a schematic view of the second embodiment of the system according to the invention, seen from above.

FIG. 3 shows a combination of the embodiments shown in FIGS. 1 and 2 as a schematic view seen from above, and indicates in broken lines how the number and angles of the lower mooring lines 6 can be varied. One of skill in the art will understand that further numbers of lower mooring lines 6 than those shown can be attached to the buoy 50, and at other angles relative to the longitudinal axis of the system than those shown.

Figure 4:
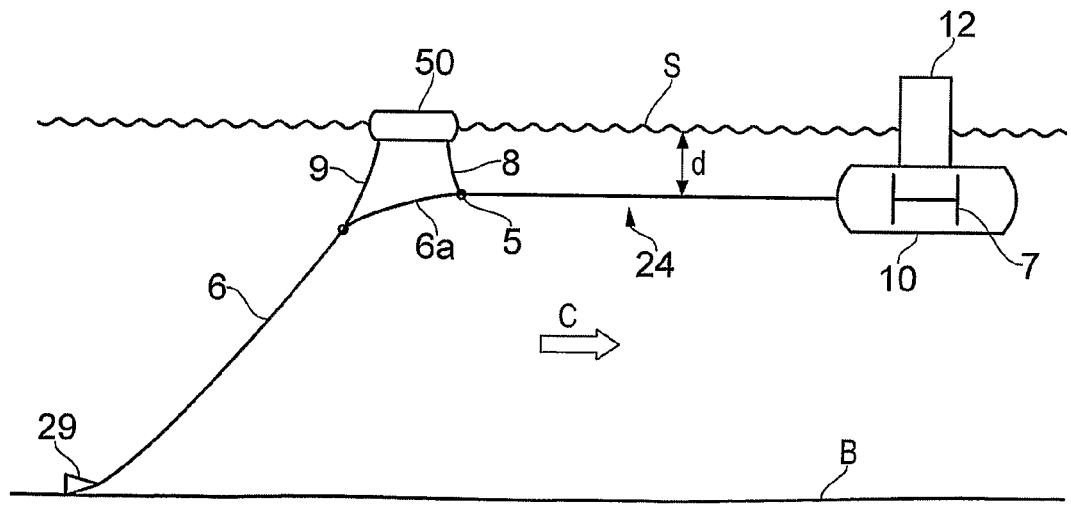
FIG. 4 is a schematic view of the second embodiment of the system according to the invention, seen from the side.

FIG. 4 shows the system according to the invention as a schematic view shown from the side, in a state where the plant 10 is partially submerged in a body of water and subjected to a current C, for production of energy with the aid of the generators 7. It can be seen from the figure that the mooring line 24 is horizontal in the water, as the attachment point of the mooring line 24 on the floating plant 10 is at a level below the water surface S which corresponds to the attachment point of the mooring line 24 to the buoy. The attachment point to the buoy is via the point of intersection 5 and the suspension line 8. The length of the suspension lines 8, 9 can be adjusted so as to correspond to the draught of the plant (which is adjusted, for example, by ballasting), so that the mooring line 24 always runs as horizontally as possible in the water. The vertical distance between the mooring line 24 and the water surface S is indicated by the designation "d" in FIG. 4. The second end of the mooring line 24 is thus connected to the buoy via suspension lines at a level below the water surface S that essentially corresponds to the level below the water surface S at which the first ends of the mooring line are connected to the body 10.

Furthermore, with reference to FIGS. 3 and 4, the production load (that is generated by the generators) is dominant and will seek to move the plant 10 in the direction of current C. Such a motion will be countered by the mooring line 24 and its connection to the lower mooring line 6 via the intermediate portion 6a (not shown in FIG. 3), which is anchored to the bottom. The vertical load components in the lower mooring line 6 are transferred via the suspension line 9 to the buoy 50, such that the loads which are transferred to the floating plant 10 through the mooring line 24 are horizontal. Thus, with the system according to the invention there is obtained only horizontal load on the moored object, i.e., the plant 10. The vertical load components which are generated as the lower mooring line is moored to the bottom are absorbed by a freely floating element, i.e., the buoy 50.

Should the load in the lines become so great that the buoy 50 becomes submerged below the water surface S, the angle between the lower mooring line and the floating plant will be reduced. Thus, the need for buoyancy is also reduced (in other words, the vertical component absorbed by the buoy) and the system according to the invention will be stabilised automatically within acceptable variations. The volume of the buoy 50 must, of course, be adapted to the maximum load in the mooring system.

FIG. 5 shows a variant of the invention wherein the plant 10 is equipped with two mooring lines 24, one at each end of the plant 10 and connected to respective buoys 50. The mooring arrangement on each side of the plant 10 is the same and, moreover, is as described above. The advantage of the variant illustrated in FIG. 5 is that it can be located in a body of water where the current direction changes, for example, in a tidal current.

Figure 6A:
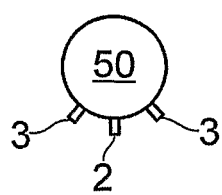
FIG. 6a is a schematic view of an embodiment of the buoyant element in the system according to the invention, seen from in front.
Figure 6B:
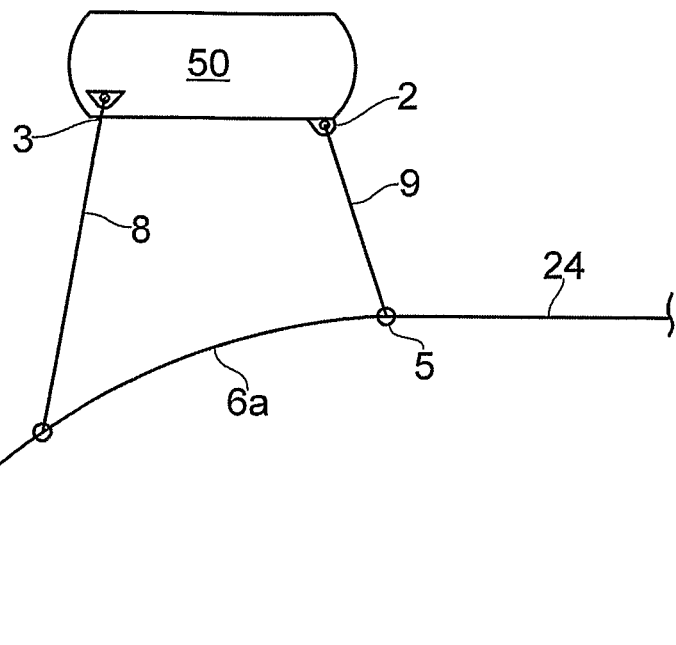
FIG. 6b is a schematic view of an embodiment of the attachment to the buoyant element, seen from the side.

FIG. 6a shows a variant of the buoy 50, seen from one end, and illustrates how it comprises attachment lugs 2, 3 for the suspension lines 9 and 8 respectively (cf. FIG. 1). FIG. 6b illustrates the variant shown in FIG. 6a, seen from the side, and it can be seen that the buoy 50 is in the form of an elongate body. Those of skill in the art will understand that the attachments of the suspension lines 8, 9 can be configured in other ways and that it is advantageous that the suspension lines 8, 9 are fastened to respective ends of the buoy 50.

The invention, equipped with one buoy (for example, FIGS. 1 and 2), will be sufficient for a plant in a river, whereas the variant with two buoys (FIG. 5) is appropriate in tidal currents or other bodies of water where the direction of current changes regularly. The embodiment of the invention with just one buoy can also be used in open sea if the anchor 29 on the bottom is replaced by a pivotal mooring element on the bottom B about which the plant could turn so that there are tension forces in the mooring lines 6, 6a and 24 at all times and the plant is thus always downstream of the buoy 50.

Those of skill in the art will understand that the lengths of the mooring lines and the suspension lines may be different, and that the lengths of the lines must be adapted to the actual floating body to be moored. That means to say, for example, that the lengths of the suspension lines may be several meters (d>>0), and that there is no longer any need for the suspension lines in the cases where the mooring line 24 is anchored to the body 10, for example, in or at the water surface (d~0). In the lastmentioned case, the second end of the mooring line 24 could be connected to the buoy 50.

With the mooring system according to the invention, it is ensured that the mooring line 24 runs as horizontally as possible in the water. In this way, the floating body, for example, the plant 10, is subjected to essentially horizontal tension loads and the plant remains as horizontal as possible in the water. The vertical load component that is usual when using conventional mooring is thus avoided. This helps to ensure that the plant only pitches slightly in the water, even in heavy seas.

A central aspect of the proposed buoy mooring system is that the anchor line that holds the plant in position when it is in operation (for example, product load/drag about 160 to 180 tonnes static+dynamic addition) does not give an essentially vertical load component on the plant 10. For example, a tension on the mooring line 24 of about 200 tonnes, with an angle of about 20 degrees between the lower mooring line 6 and the seabed and a total mooring line length of about 150 metres, gives rise to a need for about 70 tonnes of buoyancy in the buoy. For instance, the buoy 50 can be dimensioned such that the buoyancy is 70 tonnes when it breaks the water surface S. Furthermore, it is important to note that the buoy has almost the same buoyancy at all times, even though it might, for example, come 3 metres below the water surface S. However, if this happens, in that, for example, forces increase above estimated maximum, the angle between the mooring line in towards the plant and down towards the bed B will be reduced, perhaps to about 16 degrees. Thus, the need for buoyancy in the buoy will also be reduced to about 60 tonnes. The angle in towards the plant will be changed by just about 1.25 degrees, assuming about 100 metres distance between plant and buoy. Thus, the system is unique as the requirement of buoyancy in the buoy is reduced with a decreasing angle.

The invention claimed is:

1. A system for mooring a floating plant for the production of energy from currents in a body of water, comprising a ballastable plant floating in the body of water and having at least one generator for energy production, and at least one elongate first mooring element which at a first end is connected to one end of the plant, wherein the first mooring element at its second end is connected to a buoyant element which is floating in the body of water and anchored to a bottom below the body of water via at least one second elongate mooring element wherein:

the second end of the first mooring element is connected to the buoyant element via an adjustable first suspension means, the second elongate mooring element is connected to the buoyant element via at least one adjustable second suspension means, and the second end of the first mooring element is also connected to the second elongate mooring element via an elongate intermediate portion between the first suspension means and the second suspension means, said suspension means being adjustable so as to correspond to the draught of the plant, whereby the second end of the first mooring element is connected to the buoyant element at a level in the body of water that corresponds to the level in the body of water at which the first end of the first mooring element is connected to the floating plant, whereby the first mooring element runs horizontally or almost horizontally in the body of water.

2. The system according to claim 1, wherein the first mooring element, the intermediate portion and the second mooring element form a continuous elongate mooring element.

3. The system according to claim 2, wherein the buoyant element has an elongate shape and comprises attachments for the first and second suspension means at each end portion of the buoyant element.

4. The system according to claim 3, wherein the buoyancy of the buoyant element in the body of water takes up essentially all vertical load components which are transferred from the bottom via the second elongate mooring element at each end portion of the buoyant element, whereby the first mooring element exerts essentially only horizontal tension loads on the plant when the plant is installed in the body of water.

5. The system according to claim 4, wherein the plant is adapted for submersion in the body of water and comprises a projecting part which projects above the water surface when the plant is in production.

6. The system according to claim 5, wherein one elongate first mooring element is connected to a first end of the plant and a further elongate first mooring element is connected to a second, preferably, opposite end of the plant.

7. The system according to claim 6, wherein the first elongate mooring element and the second elongate mooring element comprise chain, line, wire, cable or rope, or combinations thereof.

8. The system according to claim 7, wherein the first elongate mooring element comprises synthetic fibre rope or line of other weight-neutral material.

* * * * *